US012165822B2

(12) United States Patent
Tian et al.

(10) Patent No.: US 12,165,822 B2
(45) Date of Patent: Dec. 10, 2024

(54) MODULAR CONTACTOR

(71) Applicant: SCHNEIDER ELECTRIC INDUSTRIES SAS, Rueil-Malmaison (FR)

(72) Inventors: Haifeng Tian, Shanghai (CN); Min Xu, Shanghai (CN); Xu Han, Shanghai (CN); Chuanwu Li, Shanghai (CN); Zhibao Wang, Shanghai (CN); Xuedong Xia, Shanghai (CN); Patrick Larcher, Rueil-Malmaison (FR); Vincent Geffroy, Rueil-Malmaison (FR); Daniel Sinthomez, Rueil-Malmaison (FR)

(73) Assignee: Schneider Electric Industries SAS, Rueil-Malmaison (FR)

( * ) Notice: Subject to any disclaimer, the term of this patent is extended or adjusted under 35 U.S.C. 154(b) by 166 days.

(21) Appl. No.: 17/788,904

(22) PCT Filed: Dec. 24, 2020

(86) PCT No.: PCT/CN2020/139025
§ 371 (c)(1),
(2) Date: Jun. 24, 2022

(87) PCT Pub. No.: WO2021/129743
PCT Pub. Date: Jul. 1, 2021

(65) Prior Publication Data

US 2023/0037032 A1 Feb. 2, 2023

(30) Foreign Application Priority Data

Dec. 24, 2019 (CN) ......................... 201911361511.5

(51) Int. Cl.
*H01H 50/54* (2006.01)
*H01H 50/02* (2006.01)
(Continued)

(52) U.S. Cl.
CPC ............ *H01H 50/54* (2013.01); *H01H 50/02* (2013.01); *H01H 50/14* (2013.01); *H01H 50/18* (2013.01); *H01H 50/36* (2013.01); *H01H 50/44* (2013.01)

(58) Field of Classification Search
CPC ...... H01H 50/023; H01H 49/00; H01H 50/14; H01H 50/36; H01H 50/44; H01H 50/045; H01H 50/546; H01H 2050/025
(Continued)

(56) References Cited

U.S. PATENT DOCUMENTS 3,781,728 A * 12/1973 Grunert .................. H01H 9/345 200/50.1
4,386,338 A * 5/1983 Doyle .................. H01H 51/088 307/143
(Continued)

FOREIGN PATENT DOCUMENTS

CN 201374286 Y 12/2009
CN 101840816 A 9/2010
(Continued)

OTHER PUBLICATIONS

International Search Report dated Mar. 26, 2021 for corresponding International Patent Appliction No. PCT/CN2020/139025, 6 pages.
(Continued)

*Primary Examiner* — Shawki S Ismail
*Assistant Examiner* — Lisa N Homza
(74) *Attorney, Agent, or Firm* — Locke Lord LLP

(57) ABSTRACT

A modular contactor. The modular contactor includes a driving module (1), an intermediate connection module (2), a breaking module (3), an upper application interface module (4), and a lower application interface module (5); the driving module (1) is detachably connected to a first side of the intermediate connection module (2); the breaking mod-
(Continued)

ule (3) is detachably connected to a second side of the intermediate connection module (2); the upper application interface module (4) is detachably connected to the top of the breaking module (3) so as to be electrically connected to upper static contacts of the multiple breaking units; the lower application interface module (5) is detachably connected to the bottom of the breaking module (3) so as to be electrically connected to lower static contacts of the multiple breaking units.

14 Claims, 7 Drawing Sheets

(51) Int. Cl.
*H01H 50/14* (2006.01)
*H01H 50/18* (2006.01)
*H01H 50/36* (2006.01)
*H01H 50/44* (2006.01)

(58) Field of Classification Search
USPC .......................................................... 335/185
See application file for complete search history.

(56) References Cited

U.S. PATENT DOCUMENTS 4,518,945 A * 5/1985 Doyle .................. H01H 51/088 340/12.39
5,610,375 A * 3/1997 Sinthomez ............... H01H 3/12 200/50.01
6,512,433 B1 * 1/2003 Bouchard .............. H01H 89/06 335/13
10,326,264 B1 * 6/2019 Gass ...................... H02H 3/044
2005/0073787 A1 * 4/2005 Zhou ...................... H01H 9/563 361/94
2006/0061441 A1 3/2006 Whipple et al.
2015/0248983 A1 * 9/2015 De Barros Albuquerque ............. H01H 50/02 335/133
2015/0318133 A1 11/2015 Lauraire et al.
2015/0325397 A1 * 11/2015 Larcher .............. H01H 71/0228 335/187
2016/0079021 A1 * 3/2016 De Barros Albuquerque ............. H01H 50/02 335/202
2016/0211092 A1 * 7/2016 Zimmermann ........ H01H 50/14
2017/0295653 A1 * 10/2017 Hernandez ............... H01R 4/44
2018/0011129 A1 * 1/2018 Houbre ................ G01R 15/205
2018/0012719 A1 * 1/2018 Houbre .................. H01H 89/06
2018/0166243 A1 * 6/2018 Comtois .............. H01H 71/122
2018/0337007 A1 * 11/2018 Larcher ..................... H02B 1/26
2020/0365338 A1 * 11/2020 Rushabh .............. H01H 1/0015
2021/0098214 A1 * 4/2021 Carlson ................ H01H 47/001
2021/0222684 A1 * 7/2021 Zhu ....................... F04B 39/122
2021/0304995 A1 * 9/2021 Bausch .................... H01H 9/36
2022/0020541 A1 * 1/2022 Wang ................... H01H 50/546
2022/0384124 A1 * 12/2022 Geffroy ................ H01H 50/323
2023/0026399 A1 * 1/2023 Wang ....................... H01H 9/32
2023/0030575 A1 * 2/2023 Wang ..................... H01H 50/60
2023/0069466 A1 * 3/2023 Han ..................... H01H 50/326
2023/0173860 A1 * 6/2023 Xu ........................... B60G 3/20 280/124.106

FOREIGN PATENT DOCUMENTS

CN 104362042 A 2/2015
CN 208061973 U 11/2018
CN 209822567 U 12/2019
JP S5942741 A 3/1984
JP H08329811 A 12/1996
JP 2018129291 A 8/2018

OTHER PUBLICATIONS

Extended European Search Report dated Nov. 22, 2023 for corresponding European Patent Application No. 20904526.9-1201, 15 pages.
Office Action dated Jun. 17, 2024 for corresponding Korean Patent Application No. 10-2022-7025287, 13 pages (with translation).

* cited by examiner

MODULAR CONTACTOR

CROSS-REFERENCES TO RELATED APPLICATIONS

The present application claims the priority of Chinese application CN201911361511.5 filed in the China National Intellectual Property Administration on Dec. 24, 2019.

TECHNICAL FIELD

Embodiments of the present disclosure relate to a modular contactor.

BACKGROUND

Contactor is an electrical control component with large production and wide application range, which can be used for frequently conducting and disconnecting AC and DC main circuits and large capacity control circuits. Contactor relay can realize timing operation, interlocking control, quantitative control, pressurization and undervoltage protection, and the like.

In a working process, a breaking unit of the contactor is easy to be fused, a coil of the contactor is easy to be heated and burned, and a circuit board of the contactor is easy to be damaged. A traditional contactor usually has an integrated structure, and the breaking unit, the coil and the circuit board are all mounted in a same shell. When the components of the contactor are damaged, it is usually necessary to disassemble the whole contactor for repair or replacement, which is time-consuming, labor-intensive and also inefficient. Alternatively, the whole contactor has to be disused and abandoned, which will increase the costs. Moreover, during disassembling the contactor, it is usually necessary to loosen connecting wires of cable/copper bars, which also takes a lot of time.

Therefore, how to make the contactor maintenance and repair more efficient and simpler is an urgent problem to be solved.

SUMMARY

Therefore, the objective of the present disclosure is to provide a modular contactor which has small volume, simple structure, convenient replacement, high repair and maintenance efficiency and can meet different application requirements.

The present disclosure relates to a modular contactor, the modular contactor includes a driving module, an intermediate connecting module, a breaking module, an upper application interface module and a lower application interface module. The driving module includes a static iron core, a coil and a control component; the intermediate connecting module includes a movable iron core; and the breaking module includes a plurality of breaking units. The driving module is detachably connected to a first side of the intermediate connecting module so as to be able to drive the movable iron core to move under a control of the control component; the breaking module is detachably connected to a second side of the intermediate connecting module opposite to the first side, so that the plurality of breaking units are able be opened or closed under a drive of the movable iron core; the upper application interface module is detachably connected to a top part of the breaking module so as to be electrically connected with upper stationary contacts of the plurality of breaking units; and the lower application interface module is detachably connected to a bottom part of the breaking module so as to be electrically connected with lower stationary contacts of the plurality of breaking units.

In an embodiment, the modular contactor further includes a base shell, the intermediate connecting module is detachably connected to the base shell and the breaking module can be accommodated in the base shell, and the modular contactor is arranged on a mounting plate through the base shell.

In an embodiment, the modular contactor is arranged on a mounting plate through a shell of the driving module.

In an embodiment, the plurality of breaking units are respectively accommodated in respective sub-shells, and the modular contactor is arranged on a mounting plate through the sub-shells.

In an embodiment, the intermediate connecting module further includes a stopper arranged at one end of the movable iron core close to the breaking module, and each of the plurality of breaking units includes a connecting piece which is arranged on a movable contact of the breaking unit and protruded out of a shell of the breaking module; when the breaking module is arranged on the second side of the intermediate connecting module, the stopper separates the movable contact of the breaking unit from a stationary contact of the breaking unit through the connecting piece.

In an embodiment, the intermediate connecting module further includes an elastic element arranged between a shell of the intermediate connecting module and the movable iron core, and the elastic element is configured to elastically bias the movable iron core at an opening position, so that the movable contact of the breaking unit is separated from the stationary contact of the breaking unit.

In an embodiment, a shell of the driving module is provided with a plurality of first holes, and a first side of a shell of the intermediate connecting module is provided with a plurality of second holes respectively matched with the plurality of first holes, so that the driving module is mounted on the first side of the intermediate connecting module through a plurality of screws, the plurality of first holes and the plurality of second holes.

In an embodiment, a shell of the breaking module is provided with a plurality of third holes and a plurality of hooks, and a second side of a shell of the intermediate connecting module is provided with a plurality of fourth holes matched with the plurality of third holes and a plurality of grooves matched with the plurality of hooks, so that the breaking module is mounted on the second side of the intermediate connecting module in a snap-fitted manner and through a plurality of screws, the plurality of third holes and the plurality of fourth holes.

In an embodiment, a shell of the intermediate connecting module is provided with a plurality of fifth holes, and the base shell is provided with a plurality of sixth holes matched with the plurality of fifth holes, so that the intermediate connecting module is mounted on the base shell and the breaking module is accommodated in the base shell through a plurality of screws, the plurality of fifth holes and the plurality of sixth holes.

In an embodiment, the upper application interface module includes a plurality of upper protrusions, a top part of the base shell includes a plurality of upper grooves matched with the plurality of upper protrusions, the lower application interface module includes a plurality of lower grooves, and a bottom part of the base shell includes a plurality of lower protrusions matched with the plurality of lower grooves; the plurality of upper protrusions are respectively snapped into the plurality of upper grooves so that the upper application interface module is mounted at the top part of the base shell, and the plurality of lower protrusions are respectively snapped into the plurality of lower grooves so that the lower application interface module is mounted at the bottom part of the base shell.

In an embodiment, the driving module includes a power module and a control module, the power module includes the static iron core and the coil, and the control module includes the control component.

In an embodiment, the power module and the control module are detachably connected together, or respectively detachably connected to the first side of the intermediate connecting module.

In an embodiment, the upper application interface module and the lower application interface module respectively include copper bars of different shapes so as to adjust a position and a height of connection terminals.

In an embodiment, the copper bars of the upper application interface module and/or the copper bars of the lower application interface module have a shape of C or a shape of Z.

BRIEF DESCRIPTION OF THE DRAWINGS

Advantages and objectives of the present disclosure will become easier to understand from the embodiments of the present disclosure particularly descried in connection with the drawings as below. In order to better show the relationship between the components in the drawings, the drawings are not drawn to scale. In the accompanying drawings.

DETAILED DESCRIPTION

Figure 1:
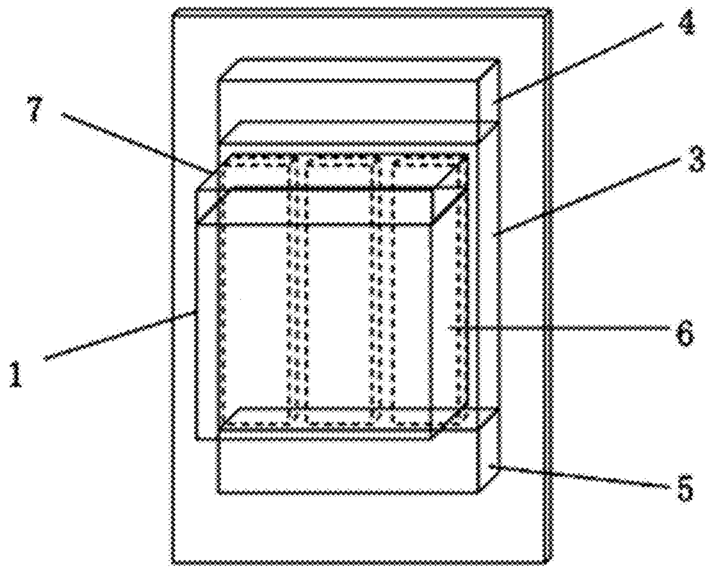
FIG. 1 is a schematic diagram highly schematically illustrating a first embodiment of a modular contactor of the present disclosure.

The embodiments of the present disclosure will be described in details with reference to the drawings. Here, it should be noted that, in the drawings, the same reference numerals are given to components that basically have the same or similar structures and functions, and repeated descriptions thereof will be omitted. Unless otherwise specified, the terms “first side”, “second side”, “right side” and “left side” in the present disclosure are described with respect to the drawings of the present disclosure. The description of “first” and its variants is only for the purpose of distinguishing various components, and is not intended to limit the scope of the present disclosure. Without departing from the scope of the present disclosure, “first component” can be written as “second component”, and so on.

The drawings accompanying the description are schematic diagrams to assist in explaining the concepts of the present disclosure, and schematically present shapes of various components and their relationships.

Hereinafter, referring to FIGS. 1 to 4, different types of embodiments of the present disclosure are described in details.

As shown in FIGS. 1-4, the modular contactor of the present disclosure includes a driving module 1, an intermediate connecting module 2, a breaking module 3, as well as an upper application interface module 4 and a lower application interface module 5. To simplify the schematic diagram, the intermediate connecting module 2 is omitted. It should be understood that, the intermediate connecting module 2 is located between the driving module 1 and the breaking module 3 to support the driving module and the breaking module and to provide a gas guiding component and a resetting component, etc.

For example, the driving module 1 includes a static iron core, a coil and a control component; the intermediate connecting module 2 includes a movable iron core; the breaking module 3 includes a plurality of breaking units. The upper application interface module 4 and the lower application interface module 5 respectively include a plurality of copper bars so as to be electrically connected with wiring terminals of users, thereby electrically connecting the modular contactor to main circuits of various applications as required. The driving module is detachably connected to a first side of the intermediate connecting module so as to be able to drive the movable iron core to move under a control of the control component. The breaking module is detachably connected to a second side of the intermediate connecting module opposite to the first side, so that the plurality of breaking units can be opened or closed under a drive of the movable iron core. The upper application interface module is detachably connected to a top part of the breaking module so as to be electrically connected with upper stationary contacts of the plurality of breaking units. The lower application interface module is detachably connected to a bottom part of the breaking module so as to be electrically connected with lower stationary contacts of the plurality of breaking units.

FIG. 1 shows a first embodiment of the modular contactor. As shown in FIG. 1, the breaking module 3 includes, for example, three breaking units, which are placed in a shell, namely a base shell, as shown by the dotted boxes in the figure. The modular contactor can be arranged on a mounting plate (the largest rectangular plate in the figure) through the base shell to realize the fixation of the contactor in various applications. The upper application interface module 4 and the lower application interface module 5 are mounted at a top part and a bottom part of the base shell, respectively, and then connected to a top part and a bottom part of the breaking module accommodated in the base shell. The driving module 1 is located on a side of the base shell accommodating the breaking module 3 that is away from the mounting plate.

Figure 2:
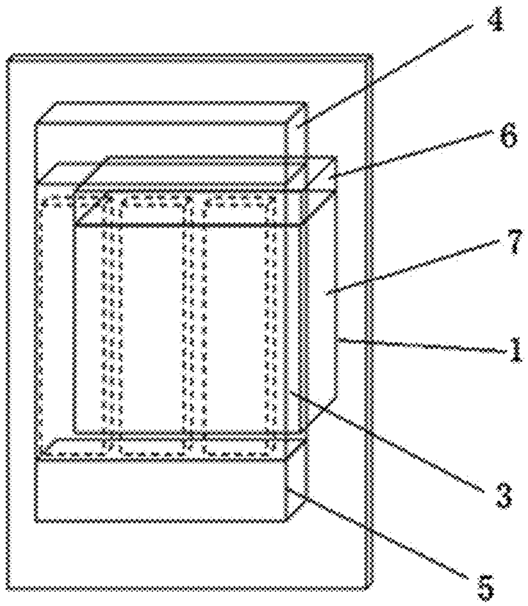
FIG. 2 is a schematic diagram highly schematically illustrating a second embodiment of a modular contactor of the present disclosure.

FIG. 2 shows a second embodiment of the modular contactor, which is different from the first embodiment in FIG. 1 in that, the modular contactor is arranged on the mounting plate through a shell of the driving module 1. That is, the driving module 1 in FIG. 2 is located between the breaking module 3 and the mounting plate.

Figure 3:
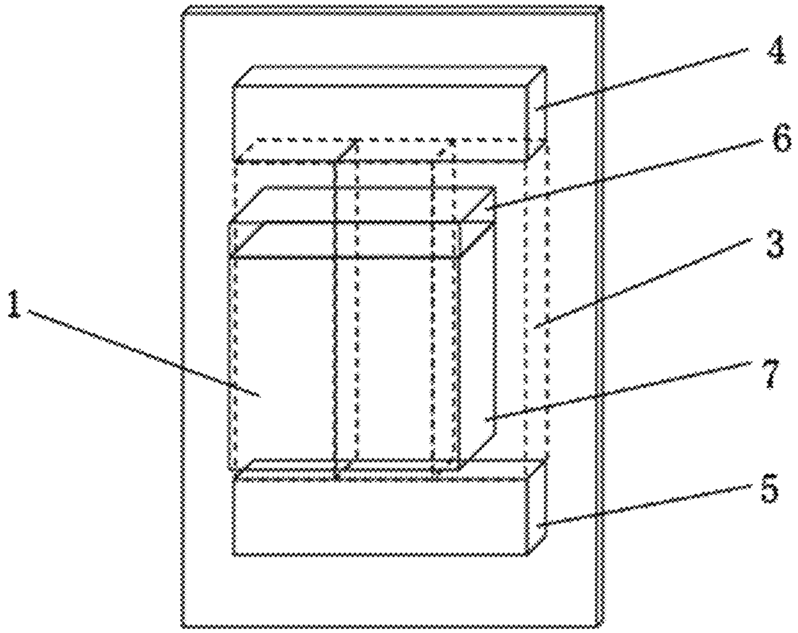
FIG. 3 is a schematic diagram highly schematically illustrating a third embodiment of a modular contactor of the present disclosure.

FIG. 3 shows a third embodiment of the modular contactor, which is different from the first embodiment in FIG. 1 in that, three breaking units are respectively accommodated in their respective sub-shells, so that the modular contactor in FIG. 3 does not include a base shell, the upper application interface module 4 and the lower application interface module 5 are respectively mounted at the top part and the bottom part of the breaking module, and the modular contactor is arranged on the mounting plate through the three sub-shells.

Figure 4:
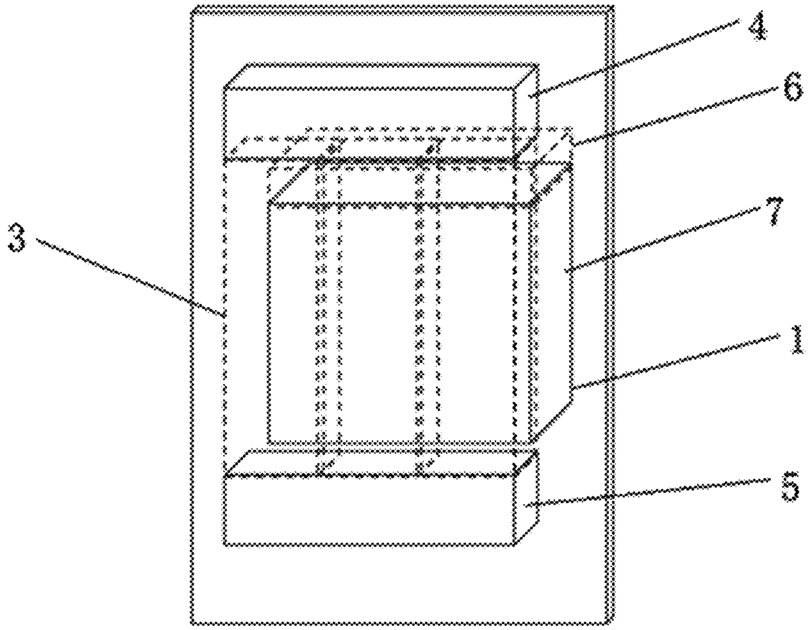
FIG. 4 is a schematic diagram highly schematically illustrating a fourth embodiment of a modular contactor of the present disclosure.

FIG. 4 shows a fourth embodiment of the modular contactor, which is similar to the structure in FIG. 3, except that the modular contactor is arranged on the mounting plate through a shell of the driving module 1, that is, the driving module 1 is located between the breaking module 3 and the mounting plate.

Moreover, as shown in FIGS. 1-4, the driving module 1 may include a power module 6 and a control module 7. The power module 6 is located above the control module 7; the power module includes, for example, a static iron core and a coil; and the control module includes, for example, a control component. For example, the power module 6 and the control module 7 are electrically connected through a soft connection, so that a control component in the form of a circuit board, for example, can send a trigger command to supply power to the coil in the power module. In other examples, the power module 6 may also be located below the control module 7, or, the power module 6 and the control module 7 may be arranged in juxtaposition in the horizontal direction. For example, the power module and the control module are detachably connected together through their respective shells, or detachably connected to the first side of the intermediate connecting module respectively.

The positions of the modules of the modular contactor in the present disclosure are not limited to the above embodiments. In other examples, the driving module and the intermediate connecting module can also be combined into a single module, that is, they are both accommodated in the same shell, and this single module can be detachably connected to the breaking module.

Hereinafter, referring to FIGS. 5 to 7, the specific structure of the modular contactor according to the present disclosure will be described in details.

Figure 5:
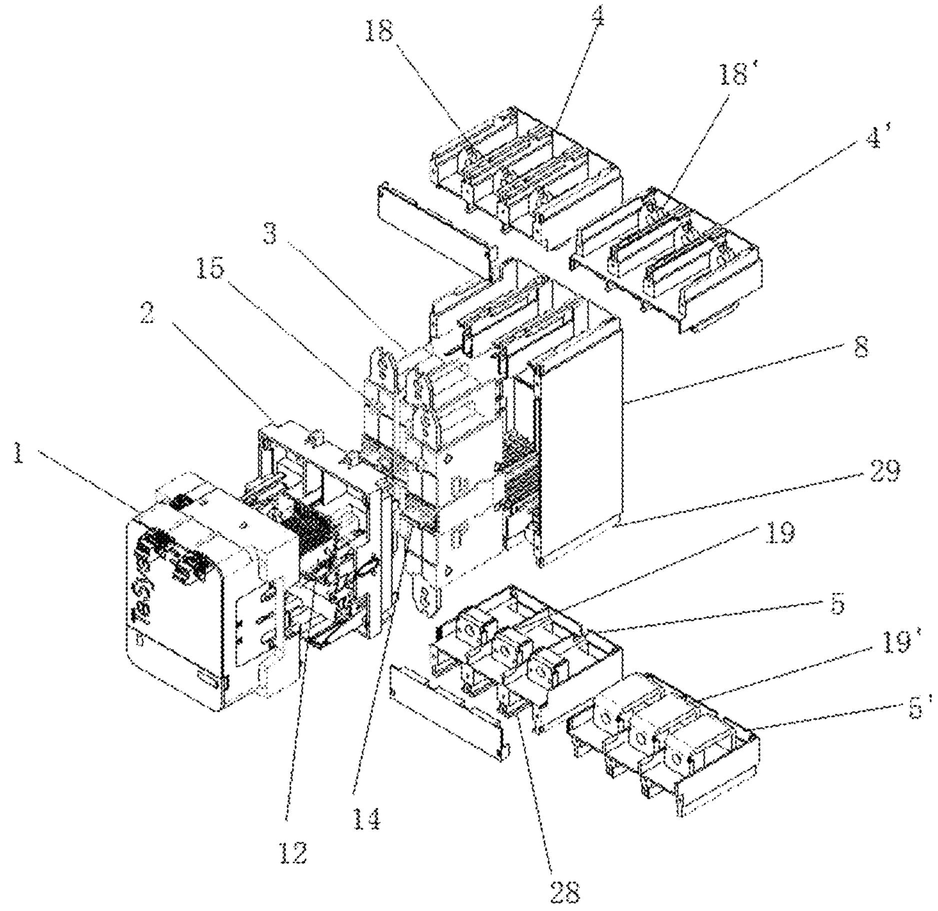
FIG. 5 is a structurally exploded view of a modular contactor of the present disclosure.
Figure 6A:
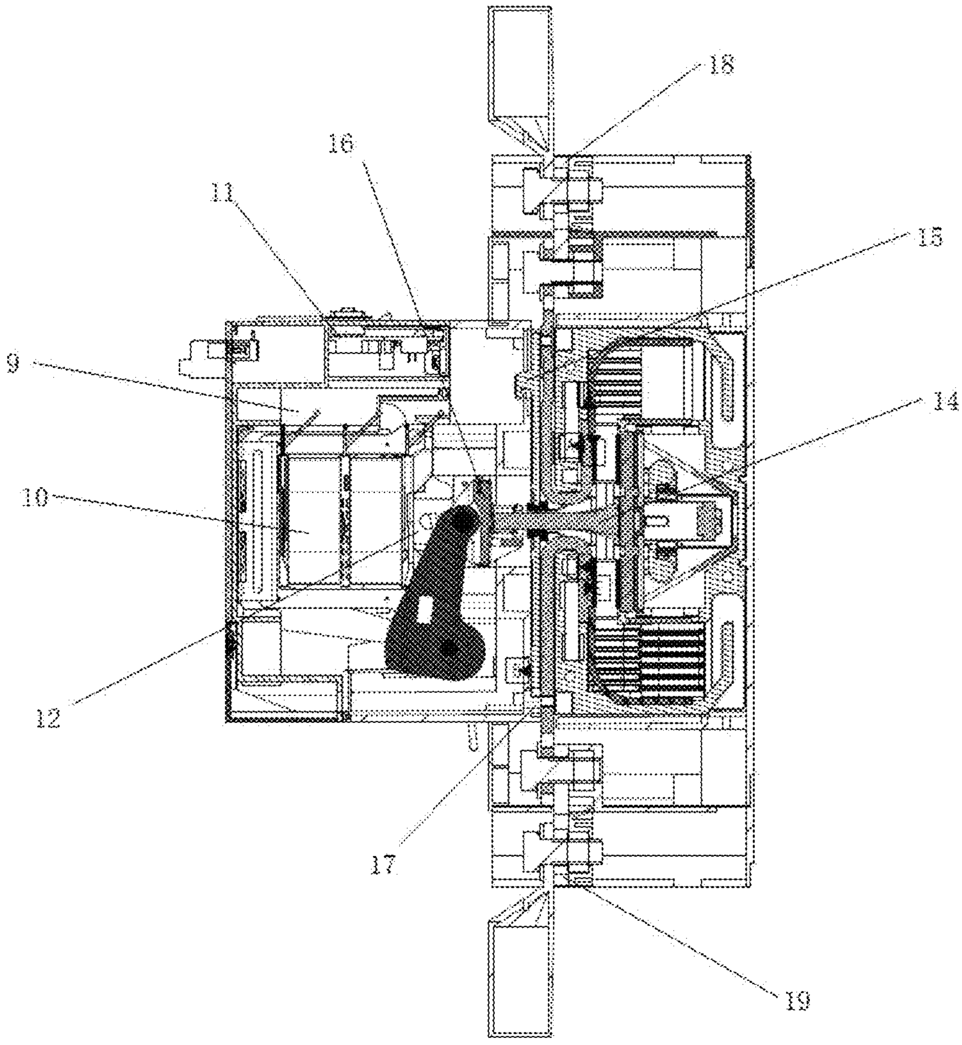
FIG. 6A is a cross-sectional view of a modular contactor of the present disclosure.
Figure 6B:
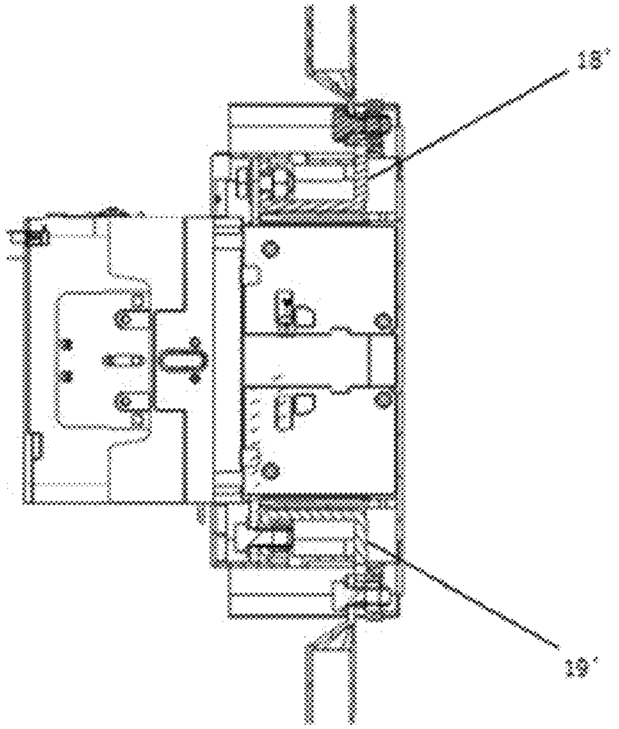
FIG. 6B is a schematic diagram of another modular contactor of the present disclosure, illustrating a cross-sectional view of an upper application interface module and a lower application interface module.

FIG. 5 shows a structurally exploded view of the modular contactor, and FIGS. 6A and 6B are schematic diagrams of various modules of the modular contactor of FIG. 5 when assembled together. FIG. 7 is a partial schematic diagram of the modular contactor, showing the connection mode between the intermediate connecting module and the breaking module.

As shown in FIGS. 5 and 6A-6B, the modular contactor 100 includes a driving module 1, an intermediate connecting module 2, a breaking module 3, as well as an upper application interface module 4 and a lower application interface module 5. The driving module 1 is detachably connected to the first side (the side facing the observer in the figure) of the intermediate connecting module 2, and the breaking module 3 is detachably connected to the second side (the side facing away from the observer in the figure) of the intermediate connecting module 2 that is opposite to the first side. Moreover, the modular contactor also includes a base shell 8 to which the intermediate connecting module 2 is detachably connected; and the breaking module is accommodated in the base shell when the various modules are assembled together. The upper application interface module 4 is detachably mounted at the top part of the base shell 8, and then detachably connected to the top part of the breaking module 3 accommodated in the base shell, so as to be electrically connected with the upper stationary contacts of the plurality of breaking units. The lower application interface module 5 is detachably mounted at the bottom part of the base shell 8, and then detachably connected to the bottom part of the breaking module 3 accommodated in the base shell, so as to be electrically connected with lower stationary contacts of the plurality of breaking units.

As shown in FIGS. 5 and 6A-6B, a static iron core 9, a coil 10 and a control component 11 are arranged in the shell of the driving module 1. The control component 11 is in the form of a circuit board, for example, and can send a trigger command to supply power to the coil 10. Moreover, there is a quick plug between the control component and other component(s), so it is not necessary to re-wire the control component when it is repaired or replaced, which reduces the required time and costs.

Figure 6C:
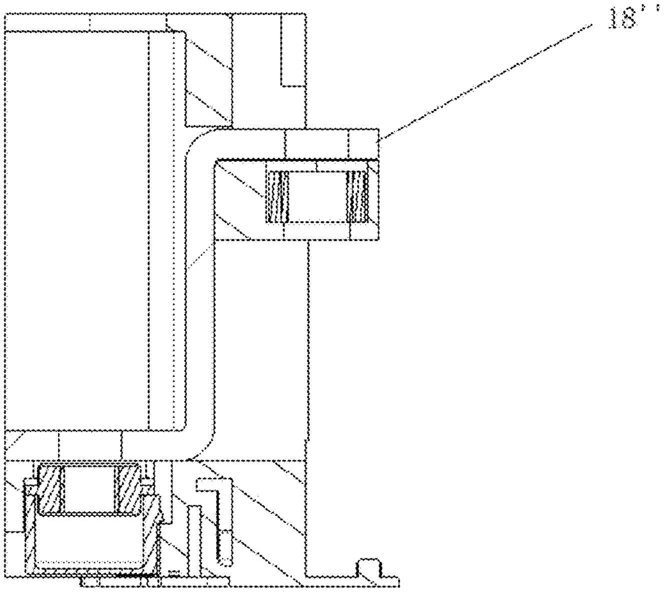
FIG. 6C is a partial cross-sectional view of an upper application interface module of a modular contactor in another embodiment of the present disclosure.
Figure 7:
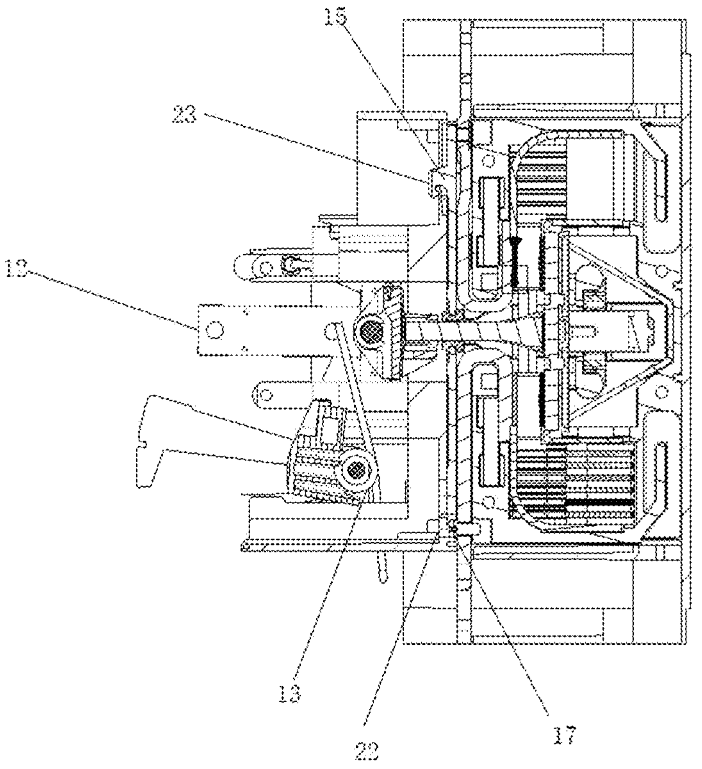
FIG. 7 is a partial schematic diagram of a modular contactor of the present disclosure, illustrating a connection mode between an intermediate connecting module and a breaking module.

As shown in FIGS. 5-7, a movable iron core 12, an elastic member 13 and a stopper 16 are arranged in the shell of the intermediate connecting module 2. The stopper 16 is provided at one end of the movable iron core 12 close to the breaking module 3. One end of the elastic member 13 is arranged on the shell of the intermediate connecting module, and the other end of the elastic member 13 is arranged on the movable iron core; the elastic member 13 is configured to elastically bias the movable iron core at an opening position, so that the movable contact is separated from the stationary contact for each breaking unit. The elastic member is a torsion spring, for example.

Moreover, as shown in FIG. 5, the breaking module 3 includes a plurality of breaking units, such as three breaking units. As shown in FIGS. 5-6, each of the plurality of breaking units includes a connecting piece 14 which is arranged on the movable contact of the breaking unit and protrudes out of the shell of the breaking module. When each of the breaking units has its own sub-shell, the connecting piece 14 protrudes out of the sub-shell.

As shown in FIGS. 6A-6B, when the modules in the modular contactor are assembled together, the breaking module is arranged on the second side of the intermediate connecting module (i.e., the right side of the intermediate connecting module), and the stopper 16 separates the movable contact of the breaking unit from the stationary contact of the breaking unit through the connecting piece 14, thereby maintaining the breaking module in an opened state.

When the coil 9 in the driving module is energized, the static iron core 10 generates an electromagnetic attraction force, which attracts the movable iron core 12 to move leftwards, and then drives the stopper 16 to move leftwards. At this time, the stopper no longer blocks the connecting piece 14, so that the movable contact moves leftwards under the action of its elastic member. When the movable iron core moves to its closed position, the movable contact contacts with the stationary contact so that the breaking module is closed. When the coil 9 is deenergized, the movable iron core 12 moves rightwards to return to its opened position under the action of the elastic force of the elastic member 13, and then drives the stopper 16 to move rightwards. At this time, the stopper drives the connecting piece 14 to drive the movable contact to move rightwards so as to be separated from the stationary contact, thus opening the breaking module.

FIG. 5 also shows different types of upper application interface modules 4 and lower application interface modules 5. The upper application interface module 4 includes a plurality of copper bars 18, for example, three copper bars 18, which are connected with the wiring terminals. The number of the copper bars 18 corresponds to the number of the breaking units. Another type of upper application interface module 4' includes three copper bars 18', for example. As shown in FIGS. 6A-6B, the copper bars of the upper application interface module and the lower application interface are electrically connected with the wiring terminals of the users through bolts. As shown in FIGS. 6A and 6B, the difference between the upper application interface modules 4 and 4' is that, the copper bar 18 has a flat plate shape and is close to the upper stationary contact of the breaking unit; while the copper bar 18' has a shape similar to "C", and a part of the copper bar 18' connected with the wiring terminal is away from the upper stationary contact of the breaking unit. The lower application interface module 5 includes a plurality of copper bars 19, such as three copper bars 19, which are connected with the wiring terminals, and the number of the copper bars 19 corresponds to the number of the breaking units. Another type of upper application interface module 5' includes three copper bars 19', for example. As shown in FIGS. 6A and 6B, the difference between the lower application interface modules 5 and 5' is that, the copper bar 19 has a flat plate shape; while the copper bar 19' has a shape similar to "C", and a part of the copper bar 19' connected with the wiring terminal is away from the lower stationary contact of the breaking unit. As shown in FIG. 6C, the copper bar 18" of the upper application interface module can also have a shape similar to "Z", and the copper bar of the lower application interface module can also have a shape similar to "Z". In this way, by selecting different types of application interface modules, users can adjust the position and the height of the wiring terminal connected with the copper bar, and then the wiring terminal can be cooperated with superior and subordinate products, for example, keeping the wiring terminal flush with a superior protection circuit breaker. Therefore, the modular contactor of the present disclosure can be flexibly used in different situations without complicated wirings.

Hereinafter, referring to FIG. 5 and FIGS. 7-10, the connection mode between various modules of the modular contactor according to the present disclosure will be described in details.

Figure 8:
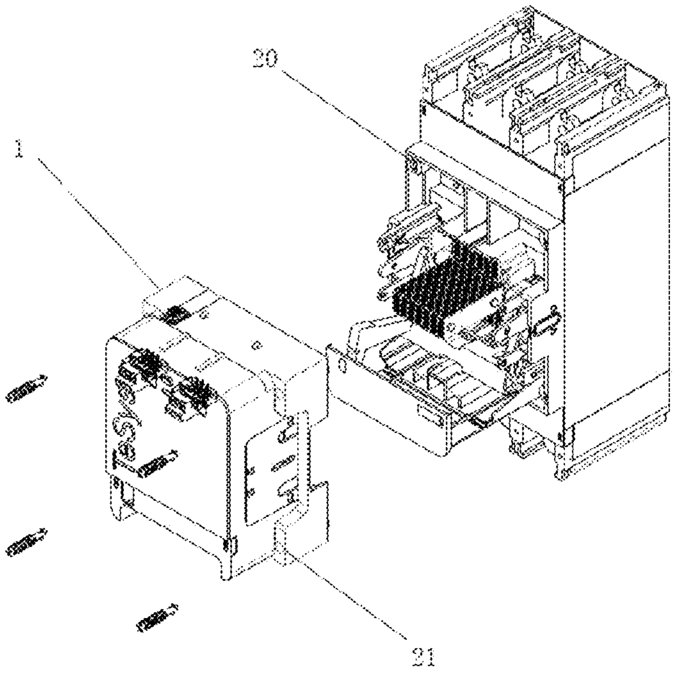
FIG. 8 is a partial schematic diagram of a modular contactor of the present disclosure, illustrating how to connect a driving module to the remaining components of the modular contactor.

FIG. 8 shows how to connect the driving module to the remaining components of the modular contactor. As shown in FIG. 8, the shell of the driving module 1 is provided with a plurality of first holes 21, for example, four first holes 21 located at four corners of the shell of the driving module. A first side of the shell of the intermediate connecting module 2 is provided with a plurality of second holes 20 respectively matched with the plurality of first holes, for example, four second holes 20 located at four corners of the shell of the intermediate connecting module 2. By screwing a plurality of screws into the plurality of first holes 21 and the plurality of second holes 20, the driving module 1 can be mounted on the first side of the shell of the intermediate connecting module 2. By screwing the plurality of screws out of the plurality of first holes 21 and the plurality of second holes 20, the driving module 1 and the intermediate connecting module 2 that are assembled together can be disassembled. In other examples of the present disclosure, the driving module and the intermediate connecting module may be connected in a snap-fitted manner.

As shown in FIGS. 5 and 7, the shell of the breaking module 3 (for example, the sub-shells of the plurality of breaking units) is provided with a plurality of third holes 17 and a plurality of hooks 15, for example, each of the breaking units includes one third hole and one hook. The second side (the right side in FIG. 7) of the shell of the intermediate connecting module 2 is provided with a plurality of fourth holes 22 matched with the plurality of third holes and a plurality of grooves 23 matched with the plurality of hooks 15. For example, the shell of the intermediate connecting module 2 is provided with three fourth holes 22 and three grooves 23, the number of the fourth holes and the grooves corresponds to the number of the breaking units. Each of the plurality of breaking units is mounted on the second side of the shell of the intermediate connecting module by snapping the hooks 15 into the grooves 23; and each of the plurality of breaking units is fixed on the second side by arranging the screws in the third holes and the fourth holes. By screwing the screws out of the third holes and the fourth holes, and then moving the plurality of breaking units of the breaking module upwards, for example, the breaking module can be disassembled from the shell of the intermediate connecting module.

Figure 9:
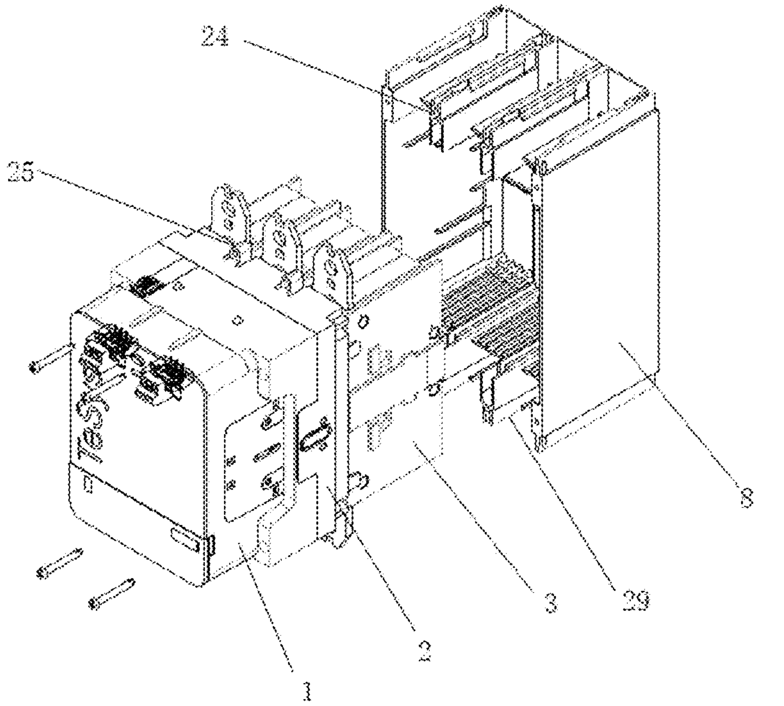
FIG. 9 is a partial schematic diagram of a modular contactor of the present disclosure, illustrating how to mount a driving module, an intermediate connecting module and a breaking module, that have been connected together, on a base shell.

FIG. 9 shows how to mount the driving module, the intermediate connecting module and the breaking module, that are connected together, on the base shell. As shown in FIG. 9, the shell of the intermediate connecting module 2 is provided with a plurality of fifth holes 25, for example, two fifth holes located at the top part of the shell of the intermediate connecting module and two fifth holes (not shown in the figure) located at the bottom part of the shell of the intermediate connecting module. The base shell 8 is provided with a plurality of sixth holes 24 matched with the plurality of fifth holes 25. By screwing a plurality of screws into the plurality of fifth holes and the plurality of sixth holes, the intermediate connecting module is mounted on the base shell and the breaking module is accommodated in the base shell. By screwing the screws out of the fifth holes and the sixth holes, the driving module, the intermediate connecting module and the breaking module that are assembled together can be detached from the base shell.

Figure 10:
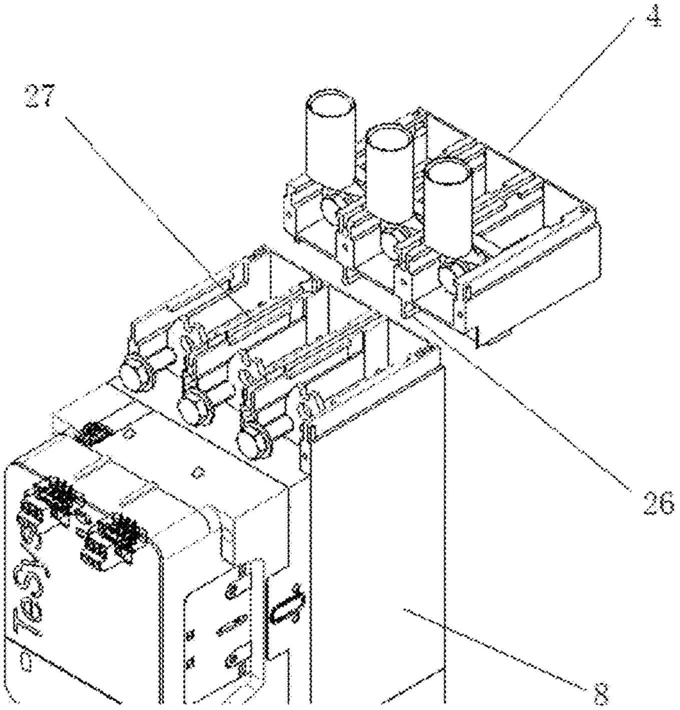
FIG. 10 is a partial schematic diagram of a modular contactor of the present disclosure, illustrating how to mount an upper application interface module on a base shell.

FIG. 10 shows how to mount the upper application interface module 4 on the base shell. The upper application interface module 4 includes a plurality of upper protrusions 26, and the top part of the base shell 8 includes a plurality of upper grooves 27 matched with the plurality of upper protrusions. Similarly, as shown in FIG. 5, the lower application interface module 5 includes a plurality of lower grooves 28, and the bottom part of the base shell 8 includes a plurality of lower protrusions 29 matched with the plurality of lower grooves. For example, the upper application interface module 4 includes four upper protrusions 26, and the top part of the base shell 8 includes four upper grooves 27; the lower application interface module 5 includes four lower grooves 28, and the bottom part of the base shell 8 includes four lower protrusions 29. As shown in FIG. 10, the size of the part of the upper protrusion 26 away from the upper application interface module is larger than that of the part of the upper protrusion 26 close to the upper application interface module, so that the upper protrusion 26 can be snapped into the upper groove 27 without moving upwards and downwards. As shown in FIG. 5, the size of the part of the lower protrusion 29 away from the base shell is larger than that of the part of the lower protrusion 29 close to the base shell, so that the lower protrusion 29 can be snapped into the lower groove 28 without moving upwards and downwards.

For example, by pushing the upper application interface module 4 from one side of the base shell (the right side in FIG. 10) to push the upper protrusions 26 into the upper grooves 27, the upper protrusions can be arranged in the upper grooves, so that the upper application interface module can be mounted on the top part of the base shell. Then, by passing bolts through the holes in the upper stationary contacts and the holes in the copper bars of the upper application interface module, the upper application interface module can be fixed with the base shell and the breaking module. After removing these bolts, by pushing the upper application interface module 4 in an opposite direction to pull the upper protrusions 26 out of the upper grooves 27, the upper application interface module 4 can be detached from the base shell. The assembly and disassembly of the lower application interface module 5 is similar to that of the upper application interface module 4, that is, the lower application interface module can be mounted at the bottom part of the base shell by arranging the lower protrusions in the lower grooves, and the lower application interface module can be detached from the base shell by separating the lower protrusions from the lower grooves.

When the breaking unit needs repair or regular maintenance due to failure, the user can take the driving module, the intermediate connecting module and the breaking module that are assembled together out of the base shell, without the need of disassembling the fastening bolts of cable/copper bars on the upper application interface module and the lower application interface module, that is, without the need of releasing the connecting wirings of the cable/copper bars. Therefore, the time and costs required for maintenance and repair can be greatly reduced, the quality risk can be lowered, and the efficiency can be improved. Moreover, when the coil or circuit board fails and needs repair or regular maintenance, the user may only need to disassemble the driving module from the intermediate connecting module for inspection, repair or replacement, without the need of disassembling other modules or releasing the connecting wires of the cable/copper bars, thus greatly reducing the time and costs required for maintenance and repair, lowering the quality risk and improving the efficiency.

The technical features disclosed above are not limited to the combination with other features having been disclosed, and those skilled in the art can also make other combinations among the technical features according to the objective of the present invention so as to achieve the objective of the present disclosure.

What is claimed is:

1. A modular contactor, comprising a driving module, an intermediate connecting module, a breaking module, an upper application interface module and a lower application interface module, wherein the driving module comprises a static iron core, a coil and a control component, the intermediate connecting module comprises a movable iron core, and the breaking module comprises a plurality of breaking units, and wherein the driving module is detachably connected to a first side of the intermediate connecting module so as to be able to drive the movable iron core to move under a control of the control component;

the breaking module is detachably connected to a second side of the intermediate connecting module opposite to the first side, so that the plurality of breaking units are able be opened or closed under a drive of the movable iron core;

the upper application interface module is detachably connected to a top part of the breaking module so as to be electrically connected with upper stationary contacts of the plurality of breaking units; and the lower application interface module is detachably connected to a bottom part of the breaking module so as to be electrically connected with lower stationary contacts of the plurality of breaking units.

2. The modular contactor according to claim 1, further comprising a base shell, wherein the intermediate connecting module is detachably connected to the base shell and the breaking module can be accommodated in the base shell, and the modular contactor is arranged on a mounting plate through the base shell.

3. The modular contactor according to claim 1, wherein the modular contactor is arranged on a mounting plate through a shell of the driving module.

4. The modular contactor according to claim 1, wherein the plurality of breaking units are respectively accommodated in respective sub-shells, and the modular contactor is arranged on a mounting plate through the sub-shells.

5. The modular contactor according to claim 1, wherein the intermediate connecting module further comprises a stopper arranged at one end of the movable iron core close to the breaking module, and each of the plurality of breaking units comprises a connecting piece which is arranged on a movable contact of the breaking unit and protruded out of a shell of the breaking module, wherein when the breaking module is arranged on the second side of the intermediate connecting module, the stopper separates the movable contact of the breaking unit from the stationary contact of the breaking unit through the connecting piece.

6. The modular contactor according to claim 5, wherein the intermediate connecting module further comprises an elastic element arranged between a shell of the intermediate connecting module and the movable iron core, and the elastic element is configured to elastically bias the movable iron core at an opening position, so that the movable contact of the breaking unit is separated from the stationary contact of the breaking unit.

7. The modular contactor according to claim 1, wherein a shell of the driving module is provided with a plurality of first holes, and a first side of a shell of the intermediate connecting module is provided with a plurality of second holes respectively matched with the plurality of first holes, so that the driving module is mounted on the first side of the intermediate connecting module through a plurality of screws, the plurality of first holes and the plurality of second holes.

8. The modular contactor according to claim 1, wherein a shell of the breaking module is provided with a plurality of third holes and a plurality of hooks, and a second side of a shell of the intermediate connecting module is provided with a plurality of fourth holes matched with the plurality of third holes and a plurality of grooves matched with the plurality of hooks, so that the breaking module is mounted on the second side of the intermediate connecting module in a snap-fitted manner and through a plurality of screws, the plurality of third holes and the plurality of fourth holes.

9. The modular contactor according to claim 2, wherein a shell of the intermediate connecting module is provided with a plurality of fifth holes, and the base shell is provided with a plurality of sixth holes matched with the plurality of fifth holes, so that the intermediate connecting module is mounted on the base shell and the breaking module is accommodated in the base shell through a plurality of screws, the plurality of fifth holes and the plurality of sixth holes.

10. The modular contactor according to claim 2, wherein the upper application interface module comprises a plurality of upper protrusions, a top part of the base shell comprises a plurality of upper grooves matched with the plurality of upper protrusions, the lower application interface module comprises a plurality of lower grooves, and a bottom part of the base shell comprises a plurality of lower protrusions matched with the plurality of lower grooves, wherein the plurality of upper protrusions are respectively snapped into the plurality of upper grooves so that the upper application interface module is mounted at the top part of the base shell, and wherein the plurality of lower protrusions are respectively snapped into the plurality of lower grooves so that the lower application interface module is mounted at the bottom part of the base shell.

11. The modular contactor according to claim 1, wherein the driving module comprises a power module and a control module, wherein the power module comprises the static iron core and the coil, and the control module comprises the control component.

12. The modular contactor according to claim 11, wherein the power module and the control module are detachably connected together, or respectively detachably connected to the first side of the intermediate connecting module.

13. The modular contactor according to claim 1, wherein the upper application interface module and the lower application interface module respectively comprise copper bars of different shapes so as to adjust a position and a height of connection terminals.

14. The modular contactor according to claim 13, wherein the copper bars of the upper application interface module and/or the copper bars of the lower application interface module have a shape of C or a shape of Z.

* * * * *